US012503913B2

(12) United States Patent
Lee et al.

(10) Patent No.: US 12,503,913 B2
(45) Date of Patent: Dec. 23, 2025

(54) BLIND LIFTING DEVICE AND A BLIND LIFTING CONTROL MODULE THEREOF

(71) Applicant: SYNCPROTO CO., LTD., New Taipei (TW)

(72) Inventors: Cheng-Hung Lee, New Taipei (TW); Lung-Yi Chiang, New Taipei (TW)

(73) Assignee: SYNCPROTO CO., LTD., New Taipei (TW)

( * ) Notice: Subject to any disclaimer, the term of this patent is extended or adjusted under 35 U.S.C. 154(b) by 226 days.

(21) Appl. No.: 18/434,650

(22) Filed: Feb. 6, 2024

(65) Prior Publication Data

US 2024/0175317 A1 May 30, 2024

Related U.S. Application Data

(63) Continuation-in-part of application No. 17/505,417, filed on Oct. 19, 2021, now Pat. No. 11,927,058.

(30) Foreign Application Priority Data

Jan. 28, 2021 (TW) ................................ 110103296

(51) Int. Cl.

*E06B 9/68* (2006.01)
*E06B 9/78* (2006.01)
*E06B 9/84* (2006.01)

(52) U.S. Cl.

CPC .................. *E06B 9/68* (2013.01); *E06B 9/78* (2013.01); *E06B 9/84* (2013.01); *E06B 2009/785* (2013.01)

(58) Field of Classification Search

CPC ..... E06B 9/68; E06B 9/78; E06B 9/60; E06B 9/56; E06B 9/42; E06B 9/80; E06B 9/82;

(Continued)

(56) References Cited

U.S. PATENT DOCUMENTS

| | | | |
|---|---|---|---|
| 187,868 | A | 2/1877 | Knapp |
| 219,185 | A | 9/1879 | Temple |

(Continued)

FOREIGN PATENT DOCUMENTS

| | | | |
|---|---|---|---|
| JP | 2009-121232 | A | 6/2009 |

OTHER PUBLICATIONS

Office Action, which was issued to Japanese counterpart application No. 2022-003899 by the JPO on Jan. 10, 2023, and machine translation (4 pages).

(Continued)

*Primary Examiner* — Johnnie A. Shablack
(74) *Attorney, Agent, or Firm* — HSML P.C.

(57) ABSTRACT

A blind lifting control module includes a transmitting wheel, an anti-backward unit and a driving unit disposed to a supporting unit. The transmitting wheel for connecting a blind reeled horizontal axle has a wheel ratchet portion meshable with a corresponding reel ratchet portion of a driving reel of the driving unit. The anti-backward unit has a torsion spring operable and deformable relative to the transmitting wheel. A pull cord is reeled on the driving reel and has a free end passing through a thrust member and a hindering member, and is pulled to shift the torsion spring to a released state to permit lowering of a blind. The thrust member is turned by pulling of the pull cord to thrust the driving reel to mesh with the transmitting wheel for lifting the blind.

20 Claims, 17 Drawing Sheets

(58) Field of Classification Search
CPC ..... E06B 9/84; E06B 9/88; E06B 9/90; E06B 2009/785; E06B 2009/801; E06B 2009/802; E06B 2009/905
See application file for complete search history.

(56) References Cited

U.S. PATENT DOCUMENTS

| | | | | |
|---|---|---|---|---|
| 1,378,347 | A | 5/1921 | Hart | |
| 1,568,203 | A | 1/1926 | Bernard | |
| 2,025,656 | A | 12/1935 | Fehan | |
| 4,476,910 | A | 10/1984 | Saito | |
| 4,534,396 | A | 8/1985 | Jung | |
| 5,029,629 | A | 7/1991 | Cheng-Pei | |
| 5,791,393 | A | 8/1998 | Judkins | |
| 5,890,529 | A | 4/1999 | Haarer | |
| 6,142,211 | A | 11/2000 | Judkins | |
| 7,128,126 | B2 | 10/2006 | Smith et al. | |
| 7,578,334 | B2 | 8/2009 | Smith et al. | |
| 7,665,507 | B2 | 2/2010 | Naoki | |
| 8,136,569 | B2 | 3/2012 | Bohlen et al. | |
| 8,186,413 | B2 | 5/2012 | Fujita et al. | |
| 8,191,605 | B2 | 6/2012 | Kwak | |
| 8,356,653 | B2 | 1/2013 | Fu-Lai et al. | |
| 8,844,605 | B2 | 9/2014 | Ng | |
| 8,851,143 | B2 | 10/2014 | Zhu | |
| 9,341,020 | B1 * | 5/2016 | Kao | E06B 9/262 |
| 9,605,477 | B2 * | 3/2017 | Huang | E06B 9/322 |
| 10,107,032 | B2 | 10/2018 | Chen et al. | |
| 10,138,676 | B2 | 11/2018 | Bohlen et al. | |
| 10,407,983 | B2 | 9/2019 | Holt et al. | |
| 10,633,917 | B2 * | 4/2020 | de Vries | E06B 9/72 |
| 11,002,072 | B2 * | 5/2021 | Bohlen | E06B 9/62 |
| 11,125,011 | B2 * | 9/2021 | Jang | E06B 9/60 |
| 11,448,009 | B2 | 9/2022 | Otsuka et al. | |
| 11,492,845 | B2 | 11/2022 | Cheng | |
| 11,505,993 | B2 | 11/2022 | De Vries et al. | |
| 11,927,058 | B2 * | 3/2024 | Lee | E06B 9/90 |
| 12,129,713 | B2 * | 10/2024 | Kim | E06B 9/42 |
| 2014/0130989 | A1 | 5/2014 | Chan et al. | |
| 2014/0131502 | A1 * | 5/2014 | Zhu | E06B 9/42<br>242/385.4 |
| 2014/0216668 | A1 | 8/2014 | Kim | |
| 2016/0281423 | A1 | 9/2016 | Kao | |
| 2018/0363370 | A1 | 12/2018 | Cheng | |
| 2019/0343318 | A1 | 11/2019 | Cheng | |
| 2022/0356763 | A1 * | 11/2022 | Lu | E06B 9/62 |

OTHER PUBLICATIONS

Search report, which was issued to European Counterpart Application No. 21207515.4 by the EPO on May 9, 2022 (5 pages).

* cited by examiner

BLIND LIFTING DEVICE AND A BLIND LIFTING CONTROL MODULE THEREOF

CROSS-REFERENCE TO RELATED APPLICATION

This is a continuation-in-part application of U.S. patent application Ser. No. 17/505,417, filed on Oct. 19, 2021, which claims priority to Taiwanese Patent Application No 110103296, filed on Jan. 28, 2021, the entire disclosure of which is incorporated herein by reference.

FIELD

The disclosure relates to a blind, and more particularly to a blind lifting device for controlling lifting of a blind, and a blind lifting control module thereof.

BACKGROUND

In the co-pending U.S. patent application Ser. No. 17/505,417, filed by the applicant, there is disclosed a blind lifting control module that includes a transmitting wheel, an anti-backward unit and a driving unit disposed to a supporting unit. The transmitting wheel for connecting a blind reeled horizontal axle has first and second ratchet portions respectively meshable with corresponding third and fourth ratchet portions of an anti-backward wheel and a driving reel. A pull cord is reeled on the driving reel and has a free end passing through a thrust member and a hindering member, and is pulled to release the anti-backward wheel to permit lowering of a blind. The thrust member is turned by pulling of the pull cord to thrust the driving reel to mesh with the transmitting wheel for lifting the blind.

SUMMARY

An object of the disclosure is to provide a blind lifting device and a blind lifting control module thereof that can be operated steadily and firmly.

According to the disclosure, the blind lifting control module is connectable with an end of a horizontal axle for controlling rotation of the axle, and includes a supporting unit, a transmitting wheel, an anti-backward unit and a driving unit. The supporting unit includes a base seat and a mounting shaft which is securely connected with the base seat and which extends parallel to the horizontal axle from the base seat. The mounting shaft has a shaft portion. The transmitting wheel is rotatably sleeved on the mounting shaft, and includes an axle connecting body which is securely connectable with the end of the horizontal axle, and a flange disc which is connected with a side of the axle connecting body proximate to the base seat and which extends radially and outwardly from the axle connecting body. The axle connecting body has a receiving groove which extends from the side for receiving the shaft portion, and an inner peripheral wall which surrounds the receiving groove. The flange disc has a wheel ratchet portion which is formed on a surface that faces the base seat and surrounds the receiving groove. The anti-backward unit includes a torsion spring which is received in the receiving groove and which surrounds the shaft portion. The torsion spring is operable and deformable relative to the inner peripheral wall between a tightened state, where the torsion spring is in tightly frictional engagement with the inner peripheral wall to permit a uni-directional rotation of the transmitting wheel, and a released state, where the torsion spring is disengaged from the inner peripheral wall. The torsion spring has an outer diameter in the released state which is smaller than that in the tightened state. The driving unit includes a driving reel which is rotatably sleeved on the shaft portion, a transmitting member which is connected between the driving reel and the anti-backward unit to transmit a rotation of the driving reel to shift the torsion spring from the tightened state to the released state, a thrust member which is movably disposed to the base seat, a hindering member which is pivotably disposed to the base seat, a pull cord which has an end secured to the driving reel and which winds on a periphery of the driving reel to have a free end for pulling operation, and a reel biasing member. The driving reel has a reel ratchet portion which faces the wheel ratchet portion, and is movable relative to the shaft portion between a driving position, where the reel ratchet portion meshes with the wheel ratchet portion, and a normal position, where the reel ratchet portion is disengaged from the wheel ratchet portion. The thrust member is movable relative to the base seat between an initial position, where the thrust member is free from action with the driving reel, and a thrusting position, where the thrust member provides a thrust force to move the driving reel to the driving position. The hindering member is turnable relative to the base seat between a hindering position, where the hindering member is kept to position the thrust member in the initial position, and a keeping-off position, where the thrust member is allowed for movement to the thrusting position. The free end of the pull cord passes through the hindering member to receive a pulling force to turn the hindering member. The reel biasing member is disposed to bias the driving reel to rotate to reel the pull cord.

According to the disclosure, the blind lifting device includes a rail, a blind lifting control module described previously, a rotating support module and a horizontal axle. The rail extends in an axial horizontal direction and has first and second ends opposite to each other. The base seat of the supporting unit is connected with the first end of the rail to have the shaft portion extending toward the second end. The rotating support module is connected with the second end of the rail. The horizontal axle for reeling a blind thereon has two ends which are respectively connected with the blind lifting control module and the rotating support module so as to be controlled for its rotation by the blind lifting control module to lift and lower the blind.

The pull cord is reeled on the driving reel in a non-operated state, which can avoid entangling children and objects nearby. The operation of lifting the blind is convenient to conduct.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
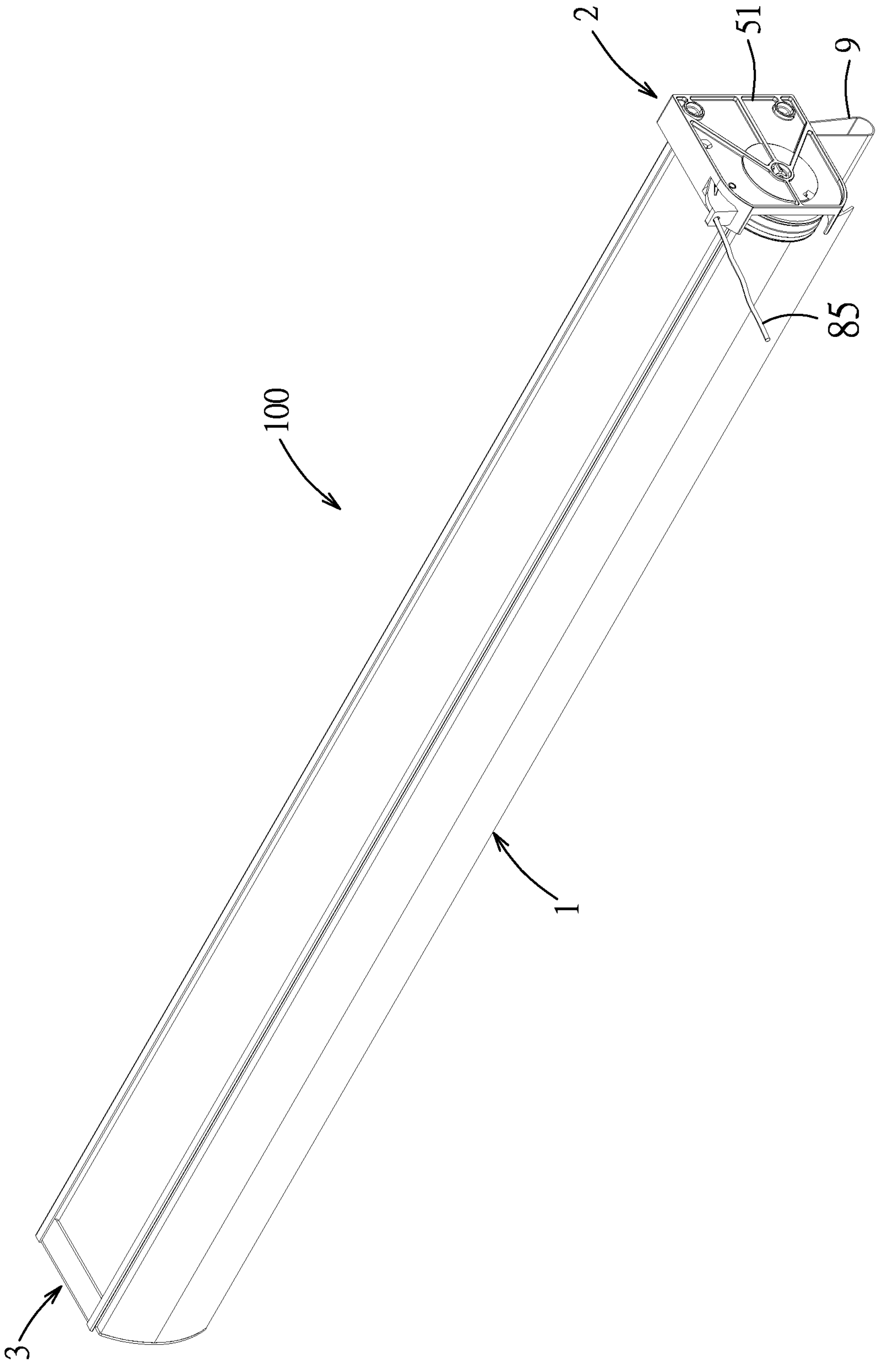
FIG. 1 is a perspective view illustrating an embodiment of a blind lifting device according to the disclosure.
Figure 2:
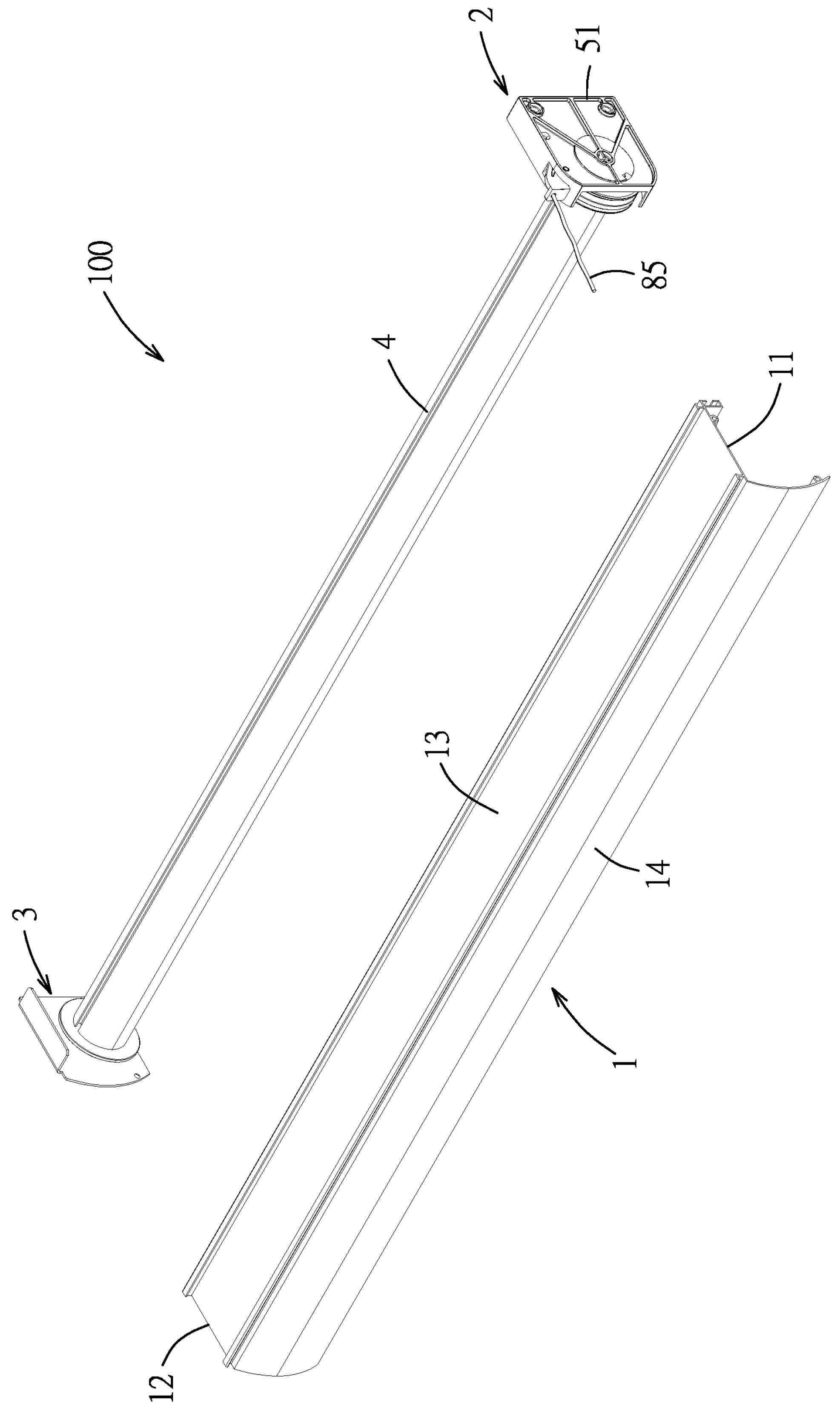
FIG. 2 is an exploded perspective view of the embodiment.

Referring to FIGS. 1 to 4, an embodiment of a blind lifting device 100 according to the disclosure includes a rail 1, a blind lifting control module 2, a rotating support module 3 and a horizontal axle 4.

The rail 1 extends in an axial horizontal direction, and has first and second ends 11, 12 opposite to each other. In one embodiment, the rail 1 includes a top wall 13 and a front wall 14 extending downwardly from a front edge of the top wall 13, and the first and second ends 11, 12 are formed at two opposite end edges of the top and front walls 13, 14. The blind lifting control module 2 is connected with the first end 11. The rotating support module 3 is connected with the second end 12. The horizontal axle 4 for reeling a blind 9 thereon has two ends which are respectively connected with the blind lifting control module 2 and the rotating support module 3 so as to be controlled for its rotation by the blind lifting control module 2 to lift and lower the blind 9. The blind 9 may be a fabric blind, Roman blind, honeycomb shade, Venetian blind, pleated blind, etc.

Figure 3:
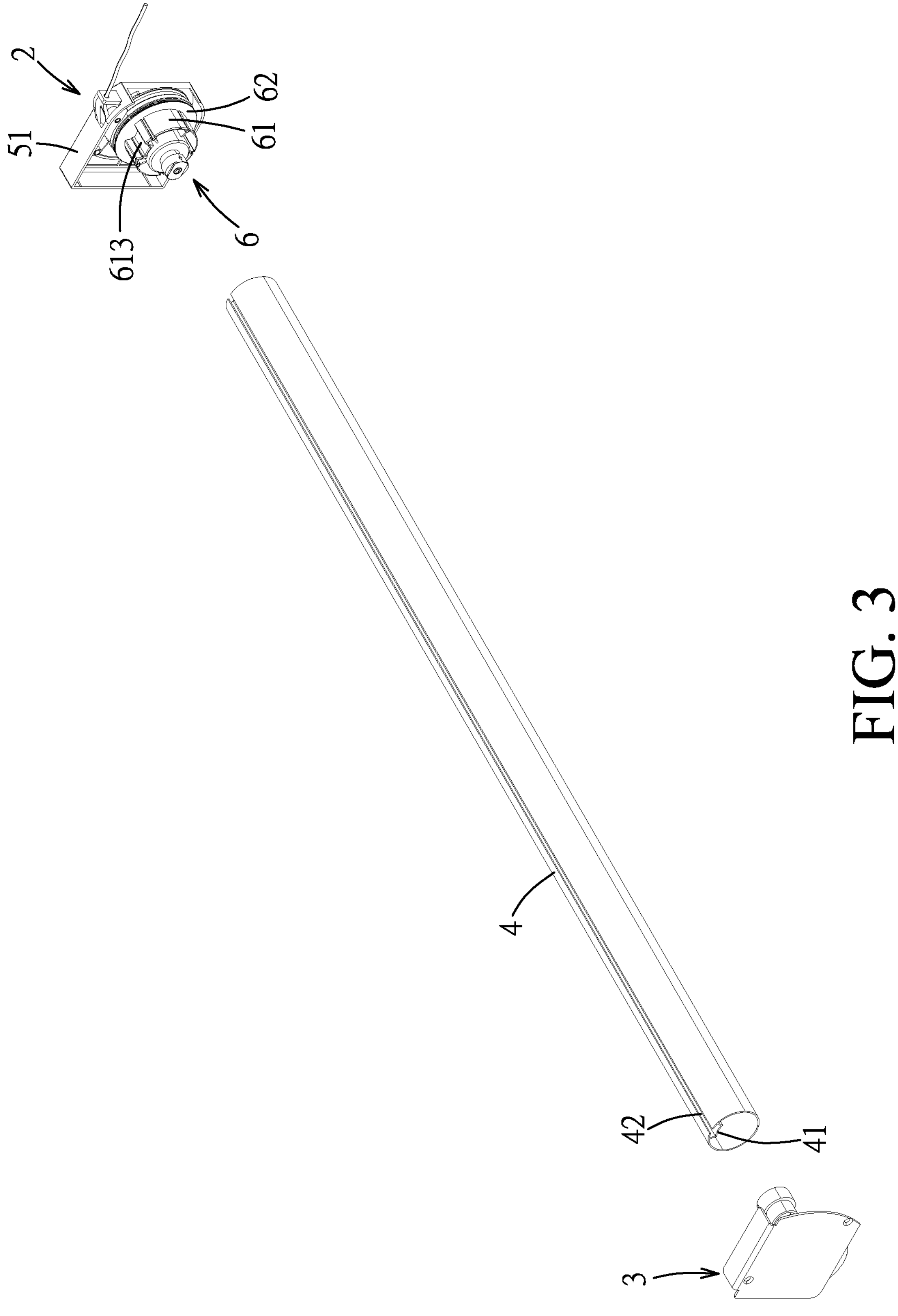
FIG. 3 is an exploded perspective view of the embodiment, a rail thereof being removed.
Figure 4:
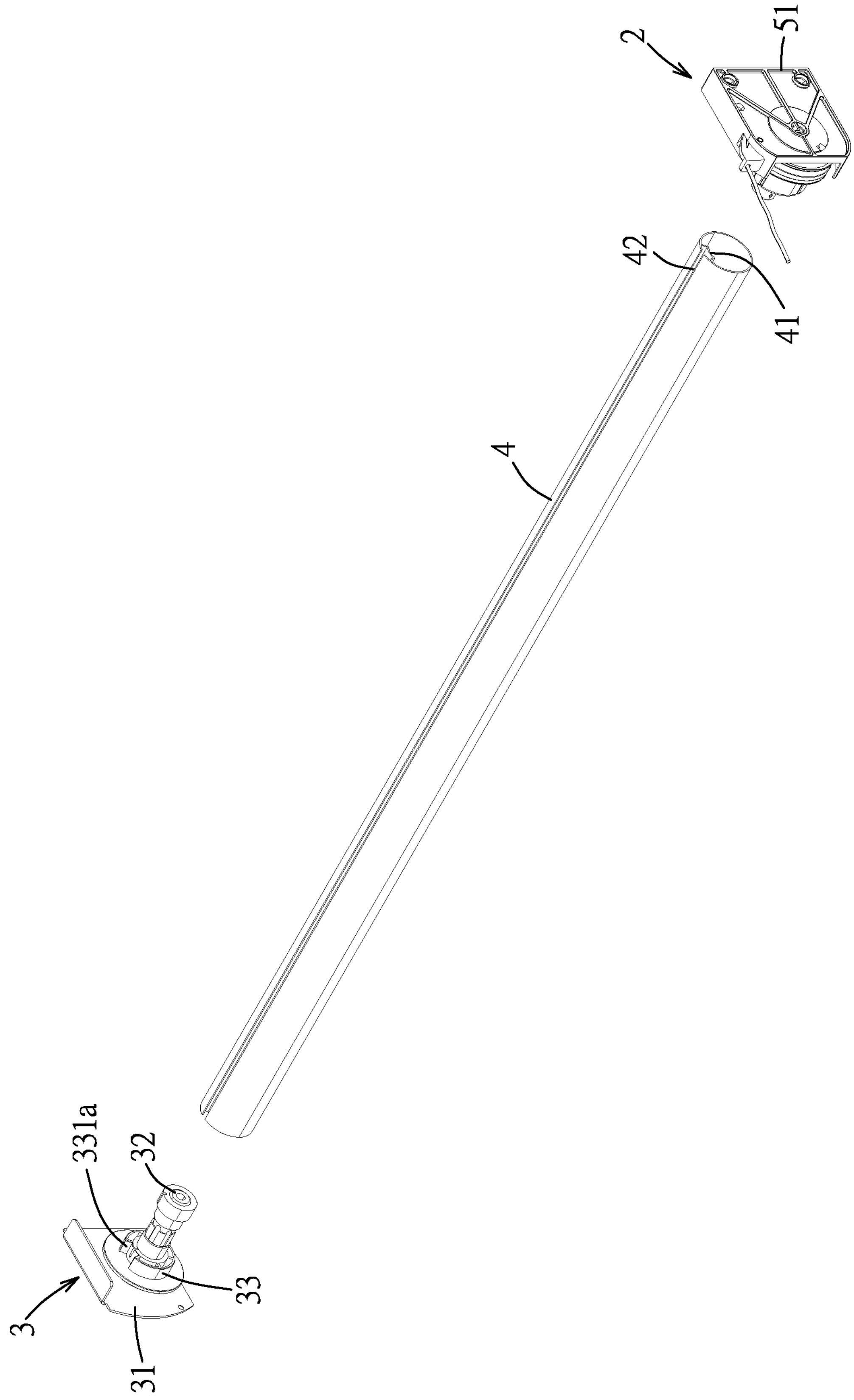
FIG. 4 is an exploded perspective view similar to FIG. 3, but taken from another angle.

With reference to FIGS. 3 and 4, the horizontal axle 4 is in the form of a tubular shaft, and has a blind engaging portion 41 which is punched and concaved from an outer surrounding wall thereof and which is elongated horizontally to the two ends to define an elongated slot 42 for securely engaging with the blind 9 (see FIG. 1).

With reference to FIGS. 5 to 9, the blind lifting control module 2 includes a supporting unit 5, a transmitting wheel 6, an anti-backward unit 7 and a driving unit 8.

The supporting unit 5 includes a base seat 51 which is connected with the rail 1 (see FIG. 1), and a mounting shaft 52 which is securely connected with the base seat 51 and which extends parallel to the horizontal axle 4 from the base seat 51. The base seat 51 has a mounting plate 511 which extends in an upright direction transverse to the axial horizontal direction and which has a plurality of annular grooves 515 that surround the mounting shaft 52 and that are angularly spaced from each other. The mounting shaft 52 has a shaft portion 521. The shaft portion 521 includes a larger-diameter segment (521*a*) abutting against the mounting plate 511, and a smaller-diameter segment (521*b*) extending horizontally from the larger-diameter segment (521*a*). The smaller-diameter segment (521*b*) has a first section (521*c*), a second section (521*d*) extending from the first section (521*c*) and having a diameter smaller than that of the first section (521*c*), and a shoulder (521*e*) disposed between the first and second sections (521*c*, 521*d*). The second section (521*d*) has a non-circular portion (521*f*). The base seat 51 further has a side wall 510 extending transverse to the mounting plate 511 and having a through slot (510*a*), and a stop wall 520 (see FIG. 9) projecting from the mounting plate 511 at an opposite side of the mounting shaft 52 relative to the side wall 510 and downwardly of the annular grooves 515. The stop wall 520 has an upwardly opened cavity (520*a*).

The transmitting wheel 6 is rotatably sleeved on the mounting shaft 52, and includes an axle connecting body 61 which is securely connectable with the end of the horizontal axle 4, and a flange disc 62 which is connected with a side of the axle connecting body 61 proximate to the base seat 51 and which extends radially and outwardly from the axle connecting body 61. The axle connecting body 61 has a receiving groove 611 which extends from the side for receiving the shaft portion 521, and an inner peripheral wall 615 which surrounds the receiving groove 611. The flange disc 62 has a wheel ratchet portion 622 which is formed on a surface that faces the base seat 51 and surrounds the receiving groove 611. The axle connecting body 61 of the transmitting wheel 6 is inserted into the one end of the horizontal axle 4, and has a first retaining slot 613 which is retainingly connected with the blind engaging portion 41 (see FIG. 3) so as to rotate with the horizontal axle 4.

The anti-backward unit 7 includes a torsion spring 73, a release reel 74 and a retaining sleeve 75. The torsion spring 73 is received in the receiving groove 611 and surrounds the shaft portion 521. The torsion spring 73 is operable and deformable relative to the inner peripheral wall 615 between a tightened state (referring to FIG. 8), where the torsion spring 73 is in tightly frictional engagement with the inner peripheral wall 615 to permit a uni-directional rotation of the transmitting wheel 6, and a released state (referring to FIG. 14), where the torsion spring 73 is disengaged from the inner peripheral wall 615. The torsion spring 73 has an outer diameter in the released state which is smaller than that in the tightened state.

The driving unit 8 includes a driving reel 81, a transmitting member 82, a thrust member 83, a hindering member 84, a pull cord 85, a reel biasing member 86, a transmitting ring 88 and a compression spring 89.

The driving reel 81 is rotatably sleeved on the shaft portion 521, and includes first and second reel halves 812, 813 coupled with each other. The first reel half 812 has a reel ratchet portion 817 facing the wheel ratchet portion 622. The driving reel 81 is movable axially relative to the shaft portion 521 between a driving position, where the reel ratchet portion 817 meshes with the wheel ratchet portion 622, and a normal position, where the reel ratchet portion 817 is disengaged from the wheel ratchet portion 622. The transmitting member 82 is connected between the driving reel 81 and the anti-backward unit 7 to transmit a rotation of the driving reel 81 to shift the torsion spring 73 from the tightened state to the released state. The thrust member 83 is movably disposed to the base seat 51 to be movable relative to the base seat 51 between an initial position, where the thrust member 83 is free from action with the driving reel 81, and a thrusting position, where the thrust member 83 provides a thrust force to move the driving reel 81 to the driving position. The hindering member 84 is pivotably disposed to the base seat 51 to be turnable relative to the base seat 51 between a hindering position, where the hindering member 84 is kept to position the thrust member 83 in the initial position, and a keeping-off position, where the thrust member 83 is allowed for movement to the thrusting position. The pull cord 85 has an end secured to the driving reel 81, and winds on a periphery of the driving reel 81 to have a free end passing through the hindering member 84 for pulling operation. Specifically, the free end of the pull cord 85 is disposed to receive a pulling force to turn the hindering member 84. The reel biasing member 86 is sleeved around the shaft portion 521 to bias the driving reel 81 to rotate to reel the pull cord 85.

The thrust member 83 is pivotably disposed to the larger-diameter segment (521*a*) of the shaft portion 521, and has a forced portion 831 through which the pull cord 85 passes to be turned by a pulling action of the pull cord 85, and a thrust portion 832 which is disposed at an opposite side of the driving reel 81 relative to the reel ratchet portion 817 to thrust the driving reel 81 such that the thrust member 83 is activated by the pulling action of the pull cord 85 to turn from the initial position to the thrusting position.

The hindering member 84 has a fulcrum portion 841 pivotably connected to the base seat 51, a hindering portion 842 disposed upwardly of the fulcrum portion 841 to engage with the thrust portion 832 of the thrust member 83 for hindering turning of the forced portion 831, and a pull portion 843 that is disposed downwardly of the fulcrum portion 841. The pull cord 85 passes through the pull portion 843. When an outwardly-inclined downward pulling force is applied to the pull cord 85, the hindering portion 842 is turned to abut against the thrust member 83.

The thrust portion 832 of the thrust member 83 has an annular portion 837 which is rotatable about and sleeved on the shaft portion 521, and a plurality of sliding protrusions 838 which project from the annular portion 837 and which are respectively and slidably engaged in the annular grooves 515 so as to move the annular portion 837 away from the mounting plate 511 with rotation of the annular portion 837 relative to the shaft portion 521 to thrust the driving reel 81. The annular portion 837 has an engaging notch (837*a*) cut from an end edge thereof that is close to the hindering portion 842 of the hindering member 84 such that, in the hindering position, the hindering portion 842 is engaged and restricted in the engaging notch (837*a*). The forced portion 831 of the thrust member 83 is in the form of a tubular wall which extends axially from an inner periphery of the annular portion 837 and which is inserted into the driving reel 81. The transmitting ring 88 is sleeved on the forced portion 831 and is frictionally interposed between the forced portion 831 and the driving reel 81 so as to transmit rotation of the driving reel 81 to rotate the forced portion 831.

The thrust member 83 further has a tab 839 projecting from an outer peripheral surface of the annular portion 837 of the thrust portion 832 and formed diametrically opposite to the engaging notch (837*a*). When the thrust member 83 is in the initial position, the tab 839 is engaged in the cavity (520*a*) and is stop by the stop wall 520.

The hindering member 84 further has a returning post 844 projecting from a side of the fulcrum portion 841. The returning post 844 deformably abuts against the side wall 510 so as to keep the hindering member 84 in the hindering position, where the hindering portion 842 is engaged and restricted in the engaging notch (837*a*). When an uprightly downward pulling force is applied to the pull cord 85, the hindering member 84 is turned through the pull portion 843 to the keeping-off position where the hindering portion 842 is remote from the engaging notch (837*a*). At the same stage, the returning post 844 is elastically bent with a restored force. The returning post 844 is returned back its posture when the pulling force is released so as to return the hindering member 84 back to the hindering position.

The annular portion 837 has two elongated grooves (837*b*) extending along the inner periphery. The base seat 51 further has two studs 519 which are disposed on the mounting plate 511 and respectively and movably engaged in the elongated grooves (837*b*) so as to limit the rotation of the thrust member 83. Alternatively, only one elongated groove (837*b*) and one stud 519 may be disposed to be movably engaged with each other.

With reference to FIGS. 6, 7, 8 and 10, the second reel half 813 has an axial through hole 814 for the forced portion 831 of the thrust member 83 to be disposed therein. The second reel half 813 further has a plurality of arcuate holes 815 surrounding the axial through hole 814, and a plurality of flexible holding arms 816 interposed between the axial through hole 814 and the arcuate holes 815 and respectively aligned with the arcuate holes 815 to hold the forced portion 831 of the thrust member 83. Through the flexible holding arms 816 holding the forced portion 831, and the transmitting ring 88 frictionally interposed between the forced portion 831 and the second reel half 813, the thrust member 83 is rotated by the frictional forces generated between the flexible holding arms 816 and the forced portion 831 and between the second reel half 813 and the transmitting ring 88. Hence, the stability of connection between the driving reel 81 and the thrust member 83 is improved so as to prolong the service life thereof.

With reference to FIGS. 6, 7, 8 and 11, in this embodiment, the release reel 74 is disposed in the receiving groove 611 of the transmitting wheel 6 and is rotatably sleeved on the shaft portion 521. The release reel 74 has a larger-diameter reel portion 741 and a smaller-diameter reel portion 742 axially extending from the larger-diameter reel portion 741. The larger-diameter reel portion 741 is pivoted to the second section (521*d*) and abuts against the shoulder (521*e*) to prevent axial movement thereof. The larger-diameter reel portion 741 has a first engaging slot 743 and a second engaging slot 744 diametrically opposite to each other. The transmitting member 82 is in the form of a string, and has two ends respectively secured to the first engaging slot 743 of the larger-diameter reel portion 741 and an engaging slot (812*e*) of the first reel half 812. One end of the torsion spring 73 is secured to the second engaging slot 744. The smaller-diameter reel portion 742 is pivoted to the first section (521*c*) such that the transmitting member 82 surrounds the smaller-diameter reel portion 742. The release reel 74 is rotated through the transmitting member 82 to rotate the torsion spring 73 so as to shift the torsion spring 73 from the tightened state to the released state.

With reference to FIGS. 6, 7, 8 and 12, the retaining sleeve 75 is disposed in the receiving groove 611 of the transmitting wheel 6, and has a non-circular axial hole 754 extending axially to be non-rotatably sleeved on the non-circular portion (521*f*) of the shaft portion 521. The retaining sleeve 75 has a sleeve portion 751 disposed adjacent to the release reel 74, a flange portion 752 extending radially from an end of the sleeve portion 751, and an abutting portion 753 extending axially from the flange portion 752 and having an outer diameter smaller than that of the flange portion 752. With the engagement of the non-circular axial hole 754 with the non-circular portion (521*f*), the retaining sleeve 75 is non-rotatably and securely mounted on the shaft portion 521 to prevent rotation and axial movement relative to the shaft portion 521.

With reference to FIGS. 6, 7, 8, 12 and 13, the retaining sleeve 75 has a spring engaging slot 755 formed in an outer surface thereof and extending axially to terminate at a slot end that extends radially toward the non-circular axial hole 754. The torsion spring 73 has a coil section 731, a connecting spring end 732 and a pulled spring end 733 at two opposite ends of the coil section 731. The coil section 731 is sleeved around the sleeve portion 751 and disposed between the release reel 74 and the flange portion 752 to be in frictional and pressed engagement with the inner peripheral wall 615 of the transmitting wheel 6. The connecting spring end 732 is retained in the spring engaging slot 755. The pulled spring end 733 is retained in the second engaging slot 744 of the release reel 74. The pulled spring end 733 is pulled by the release reel 74 to rotate the coil section 731 so as to reduce the outer diameter of the coil section 731.

Specifically, the torsion spring 73 is rectangular in cross-section to be in a surface frictional engagement with the inner peripheral wall 615 so as to increase the retention of the torsion spring 73 with the transmitting wheel 6 for preventing undesired rotation. Alternatively, the torsion spring 73 may be circular in cross-section and in a line frictional engagement with the inner peripheral wall 615.

Figure 6:
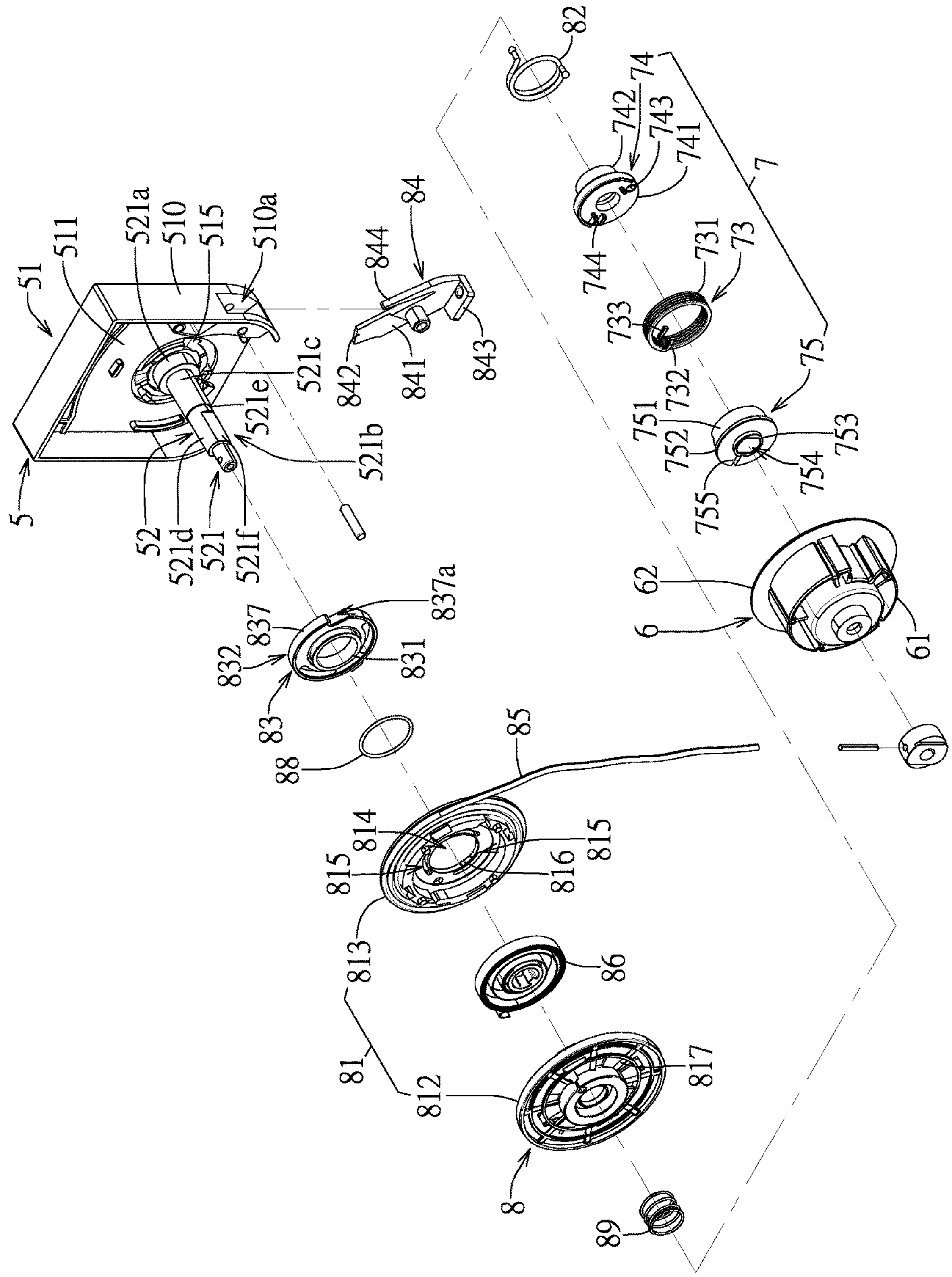
FIG. 6 is an exploded perspective view of the blind lifting control module.
Figure 7:
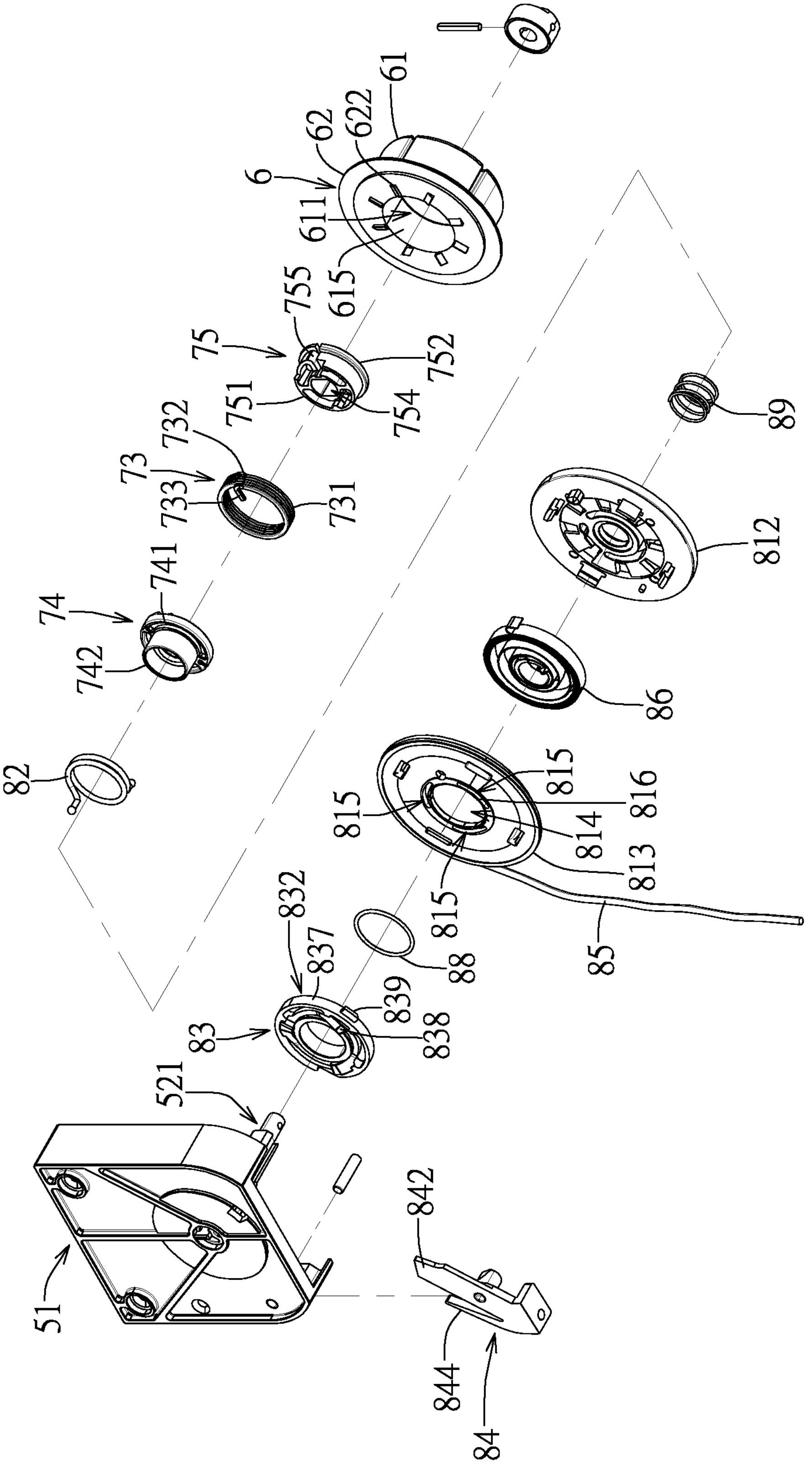
FIG. 7 is an exploded perspective view similar to FIG. 6, but taken from another angle.
Figure 8:
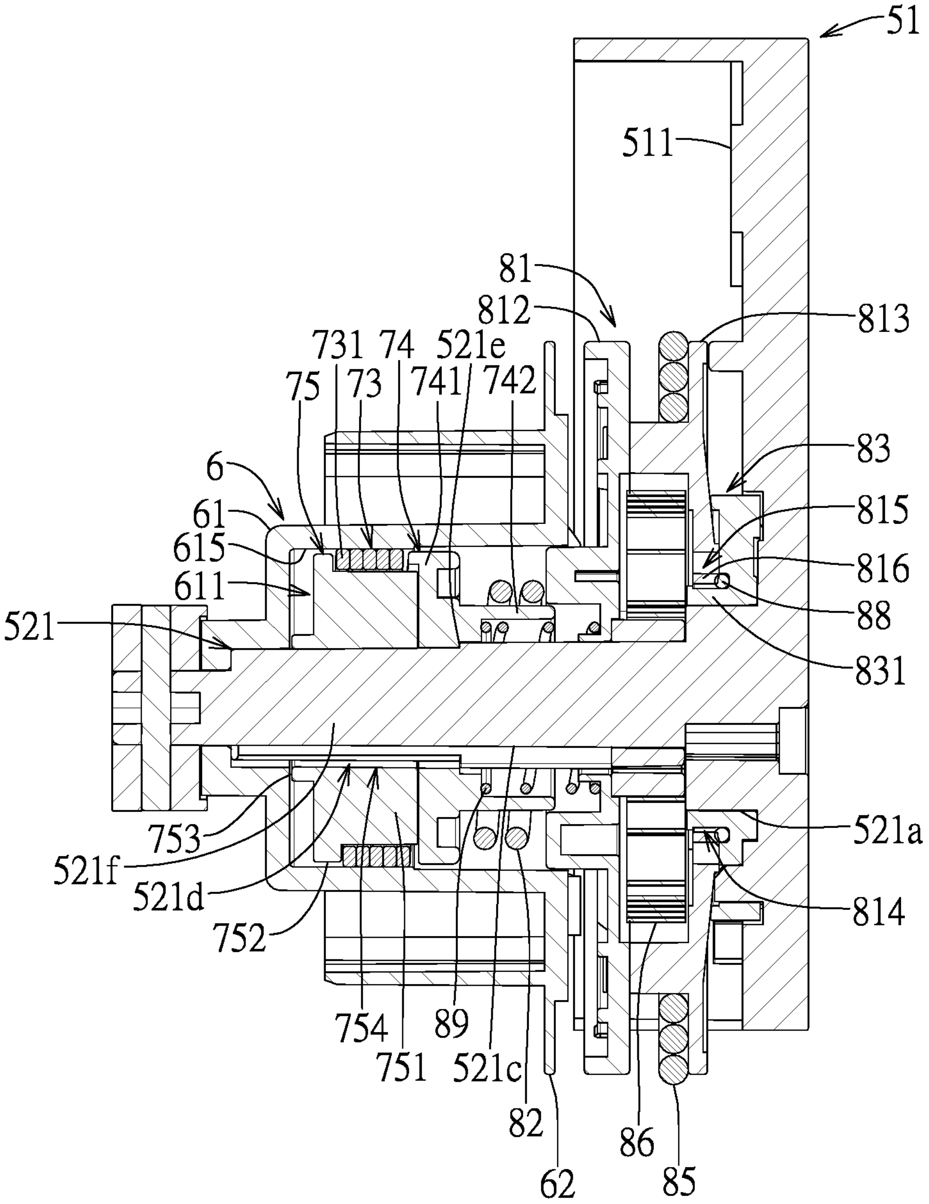
FIG. 8 is a sectional view taken along line VIII-VIII of FIG. 5, illustrating when a torsion spring is in a tightened state.

With reference to FIGS. 6 to 8, the compression spring 89 is sleeved around the first section (521*c*) of the shaft portion 521, and has two ends which respectively abut against the smaller-diameter reel portion 742 of the release reel 74 and the first reel half 812 of the driving reel 81 so as to bias the driving reel 81 toward the normal position.

With reference to FIGS. 4 and 15 to 17, the rotating support module 3 includes a mounting wall 31 which extends in the upright direction to be connected with the rail 1 (see FIG. 1), a support axle 32 which is secured to the mounting wall 31 and which extends horizontally toward the blind lifting control module 2, and a rotary seat 33 which is rotatably sleeved on the support axle 32. The rotary seat 33 has an axle connecting portion 331 which is inserted into the other end of the horizontal axle 4 and which has a second retaining slot (331*a*) that is retainingly connected with the blind engaging portion 41 so as to be rotated with the horizontal axle 4.

The rotating support module 3 further includes a speed-reducing sleeve 34 and a coil member 35. The rotary seat 33 further has a tubular portion 332 which extends horizontally from the axle connecting portion 331 toward the blind lifting control module 2 to spacedly surround the support axle 32 and which has a diameter smaller than that of the axle connecting portion 331. The support axle 32 has an axle body 321 and at least one frictional ring 322 (two frictional rings 322 are shown). The axle body 321 has a secured end portion (321*a*) which is secured to the mounting wall 31, and a free end portion (321*b*) which is opposite to the secured end portion (321*a*) and exposed from the rotary seat 33. The frictional rings 322 surround the free end portion (321*b*), and are elastic O-rings to generate a frictional resistance with the speed-reducing sleeve 34.

The speed-reducing sleeve 34 has a sleeve body 341 which is sleeved on the free end portion (321*b*), and a plurality of elastic plates 342 which are arranged around the axle body 321 and which extend from the sleeve body 341 toward the rotary seat 33 and have terminate ends interposed between the tubular portion 332 and the axle body 321. The coil member 35 is sleeved around the speed-reducing sleeve 34, and has two ends which are respectively secured to the rotary seat 33 and the sleeve body 341.

As shown in FIG. 1, the horizontal axle 4 is rotated forwardly to lift the blind 9 and a clockwise rotational direction of the horizontal axle 4 is defined. The horizontal axle 4 is rotated rearwardly to lower the blind 9 and a counterclockwise rotational direction of the horizontal axle 4 is defined. During rotation of the horizontal axle 4 in the counterclockwise rotational direction, the speed-reducing sleeve 34 is in frictional contact with the frictional rings 322 to have a rotational speed slower than that of the rotary seat 33, and to shrink the coil member 35 to compress the elastic plates 342 toward the axle body 321 so as to reduce the rotational speed of the rotary seat 33 and to slowly lower the blind 9. When the horizontal axle 4 is rotated with the blind lifting control module 2 in the clockwise rotational direction to lift the blind 9, the coil member 35 is returned back to its original position and the elastic plates 342 loosely surround the axle body 321. In this state, the rotating support module 3 generates a relatively small torque to permit an operator to operate the pull cord 85 of the blind lifting control module 2 with less effort.

The operation of the blind lifting control module 2 is described in detail as follows.

Figure 5:
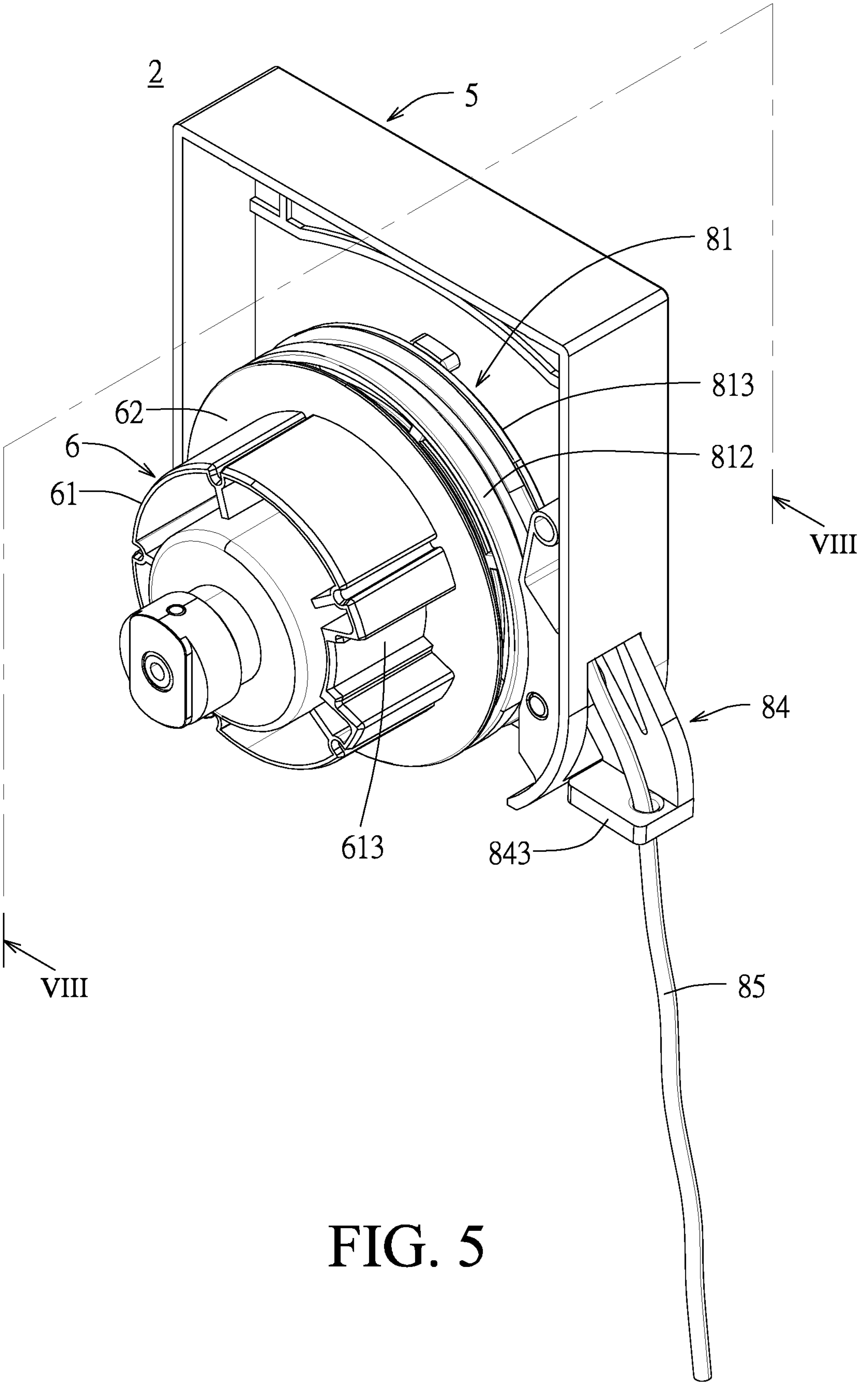
FIG. 5 is a perspective view illustrating a blind lifting control module of the embodiment.
Figure 9:
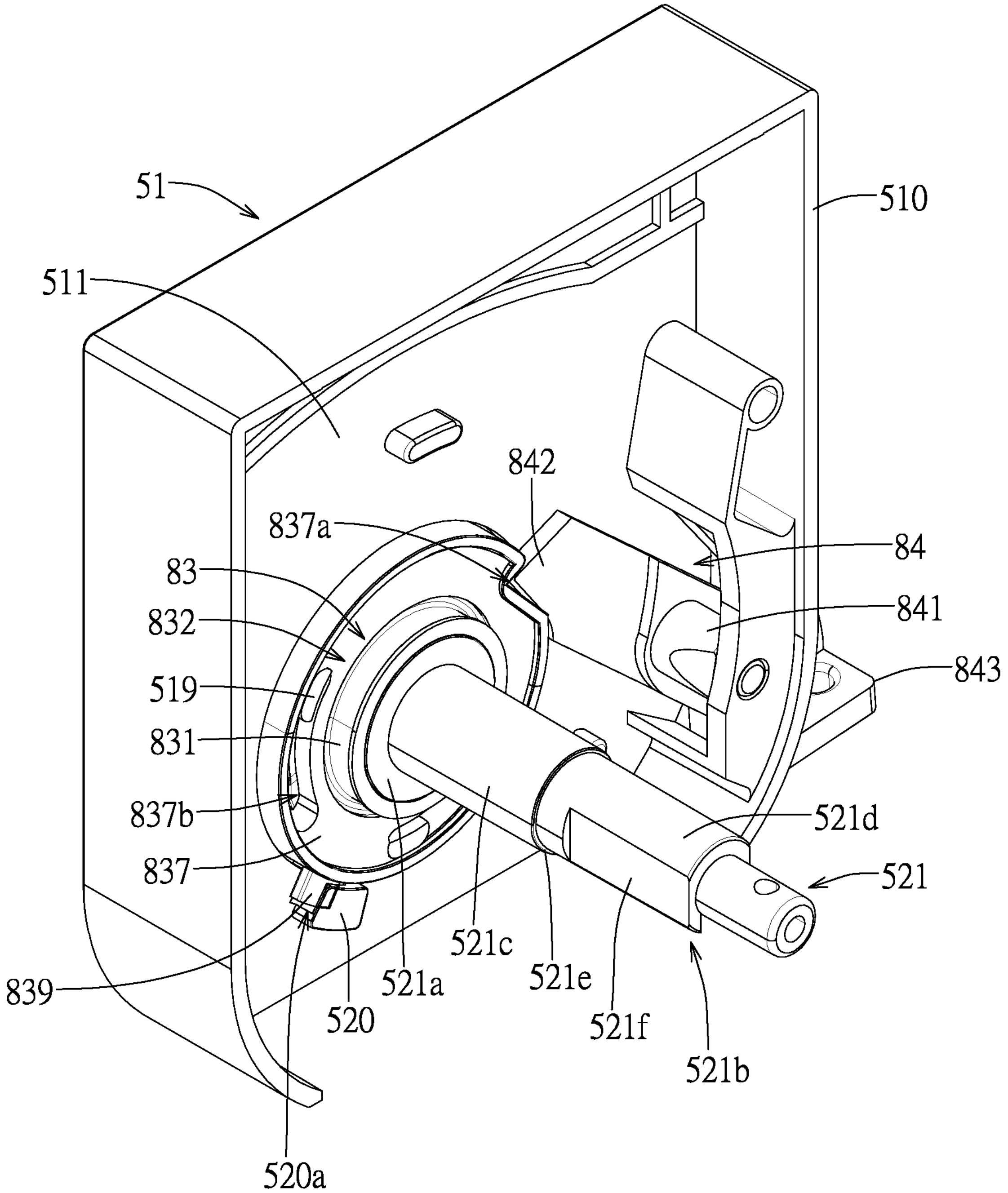
FIG. 9 is a perspective view of a portion of the blind lifting control module.
Figure 10:
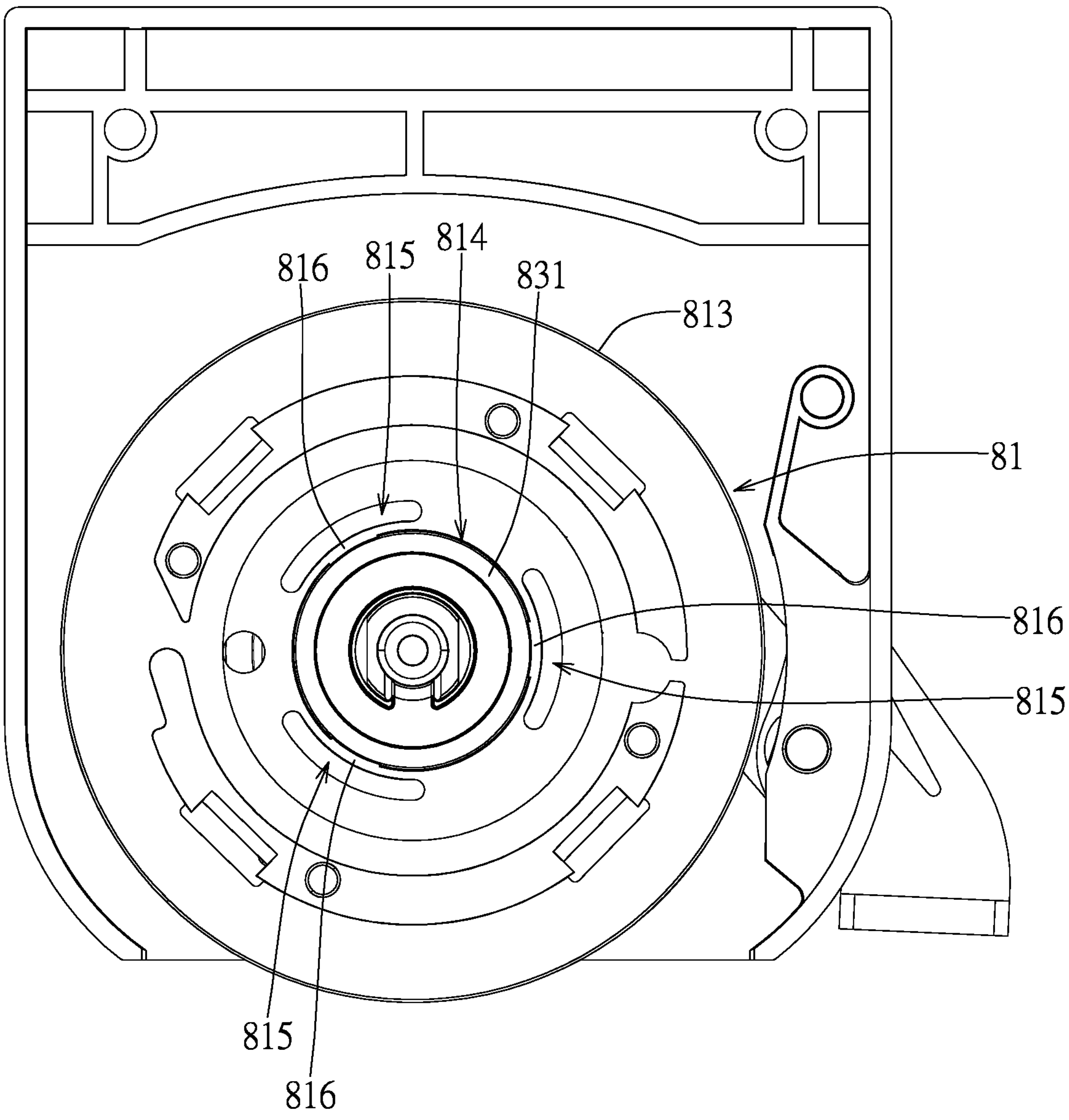
FIG. 10 is a side view of a portion of the blind lifting control module.
Figure 11:
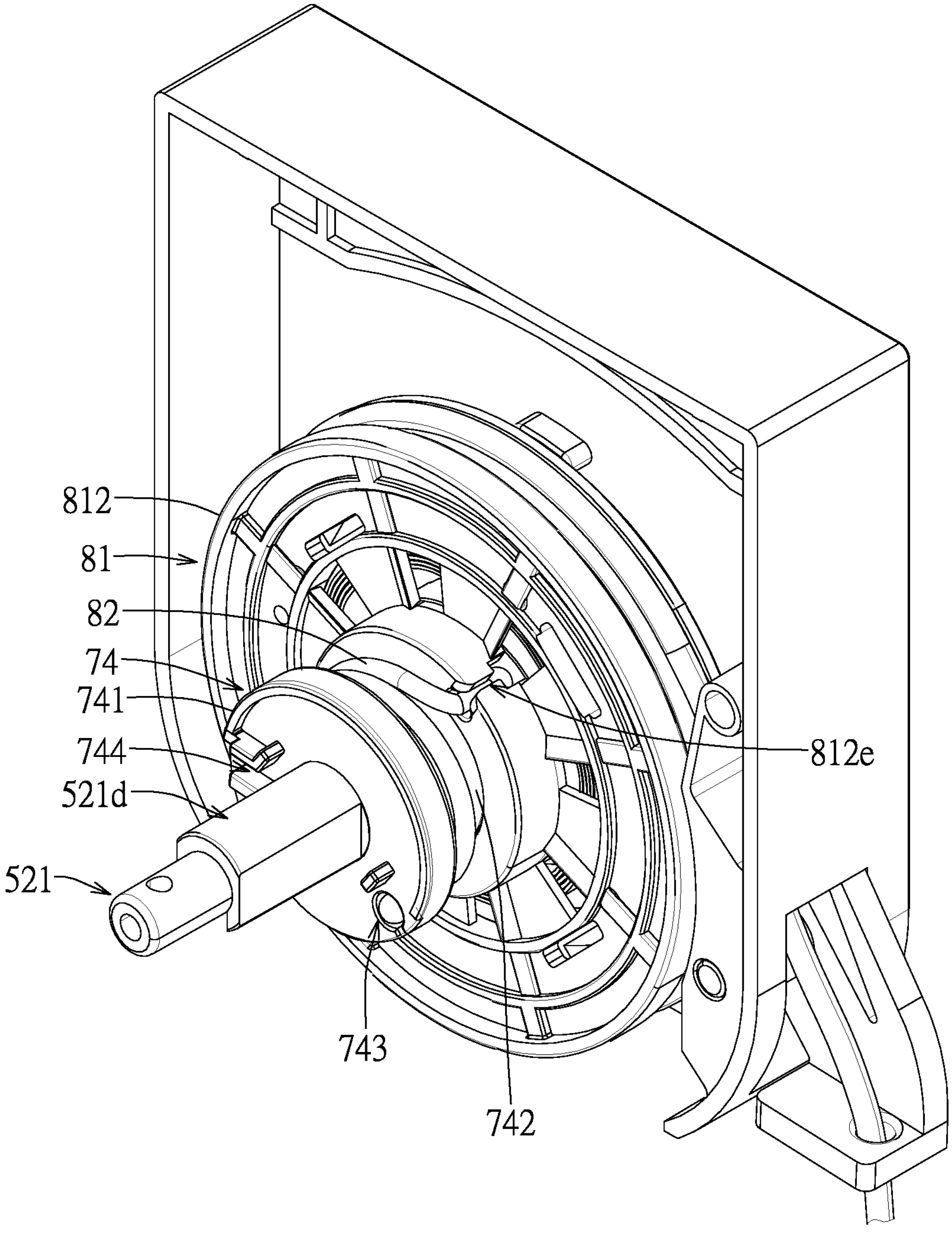
FIG. 11 is a perspective view of a portion of the blind lifting control module.
Figure 12:
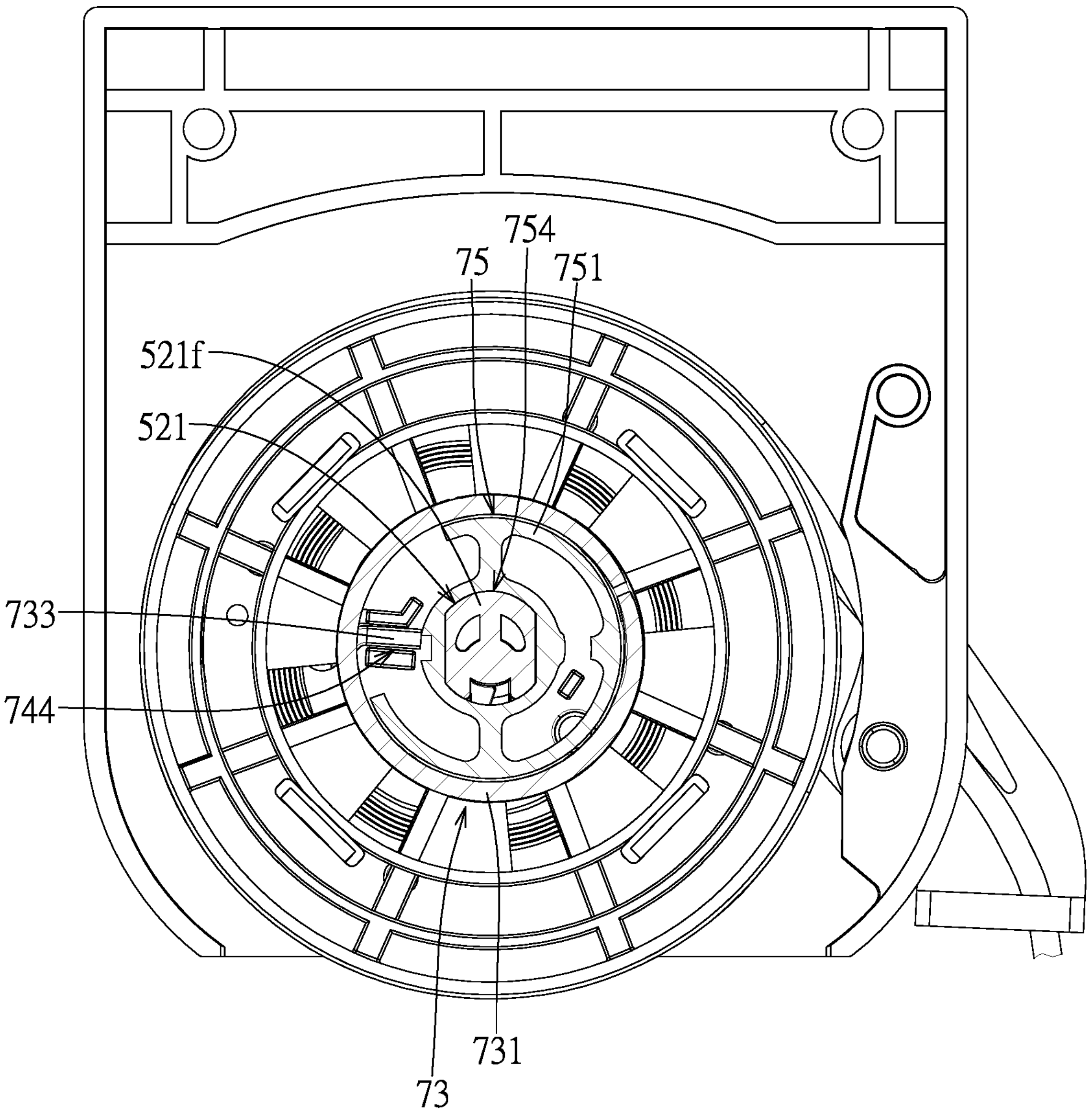
FIG. 12 is a sectional view of a portion of the blind lifting control module.
Figure 13:
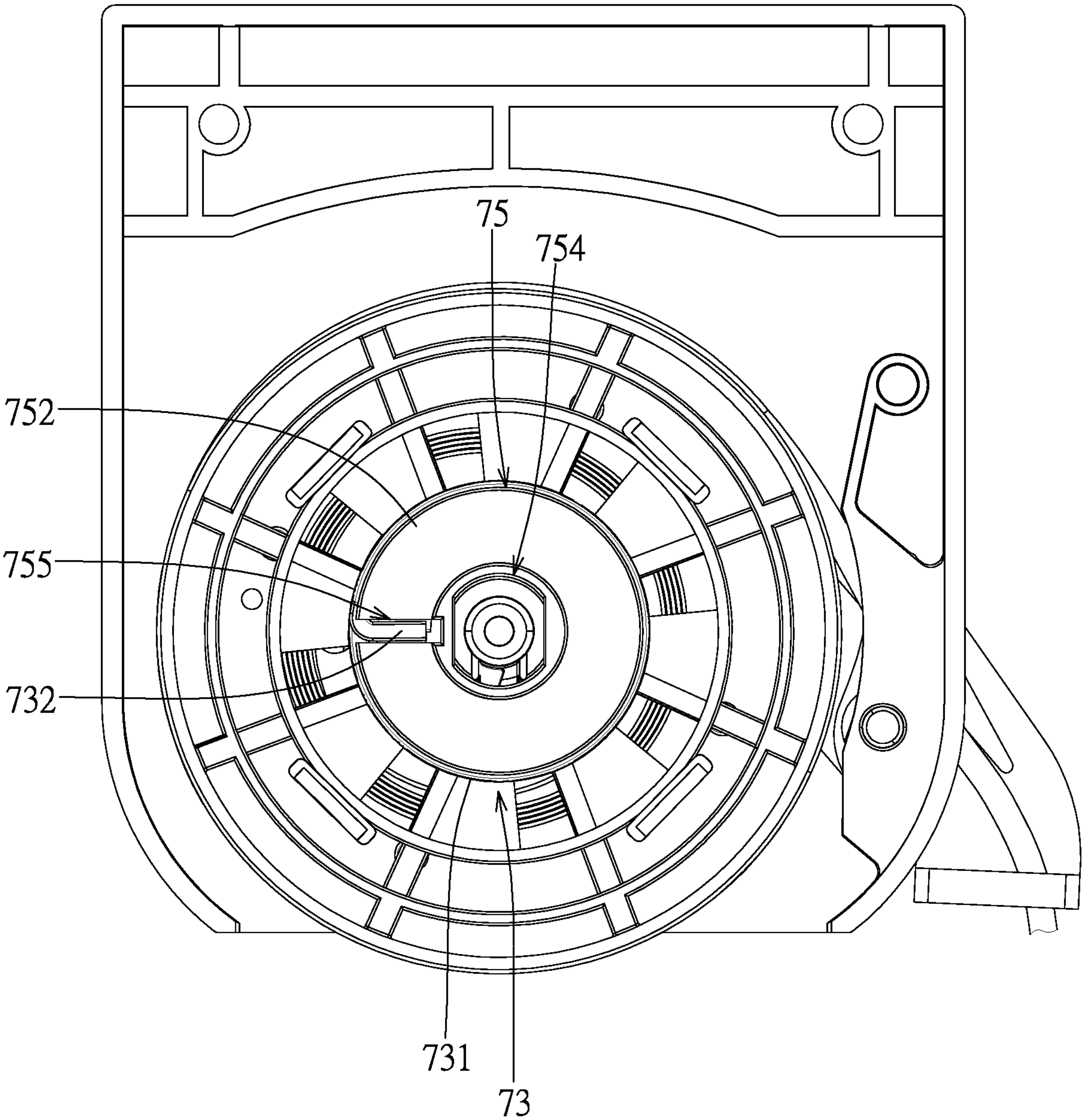
FIG. 13 is a side view of a portion of the blind lifting control module.

With reference to FIGS. 5, 8 and 9, when the pull cord 85 is applied with an outwardly-inclined downward pulling force (remote from the driving reel 81) to turn the pull portion 843 outward, and the hindering portion 842 is engaged with the engaging notch (837*a*) to be held in the hindering position so as to position the thrust member 83 in the initial position. At this stage, the driving reel 81 is in the normal position and free from action with the transmitting wheel 6. Thus, the driving reel 81 is rotated through the pulling force applied to the pull cord 85 without rotation of the transmitting wheel 6 and the horizontal axle 4 (see FIG. 2). Rotation of the driving reel 81 brings about winding tight of the transmitting member 82 on the smaller-diameter reel portion 742 of the release reel 74. The transmitting member 82 is pulled and tensed to a tensed state to rotate the release reel 74. The release reel 74 brings the pulled spring end 733 of the torsion spring 73 to rotate so as to rotate the coil section 731 to reduce its outer diameter. At this stage, the torsion spring 73 is deformed with a restored biasing force. When The pulling force applied to the pull cord 85 might be transmitted by the driving reel 81 to the thrust member 83. Hence, with the tab 839 of the thrust member 83 engaged in the cavity (520*a*) and stopped by the stop wall 520, the thrust member 83 can be kept stable to prevent deflection of a distal side of the thrust member 83 opposite to the engaging notch (837*a*) so as to avoid adverse interference with the driving reel 81 and the transmitting wheel 6.

Figure 14:
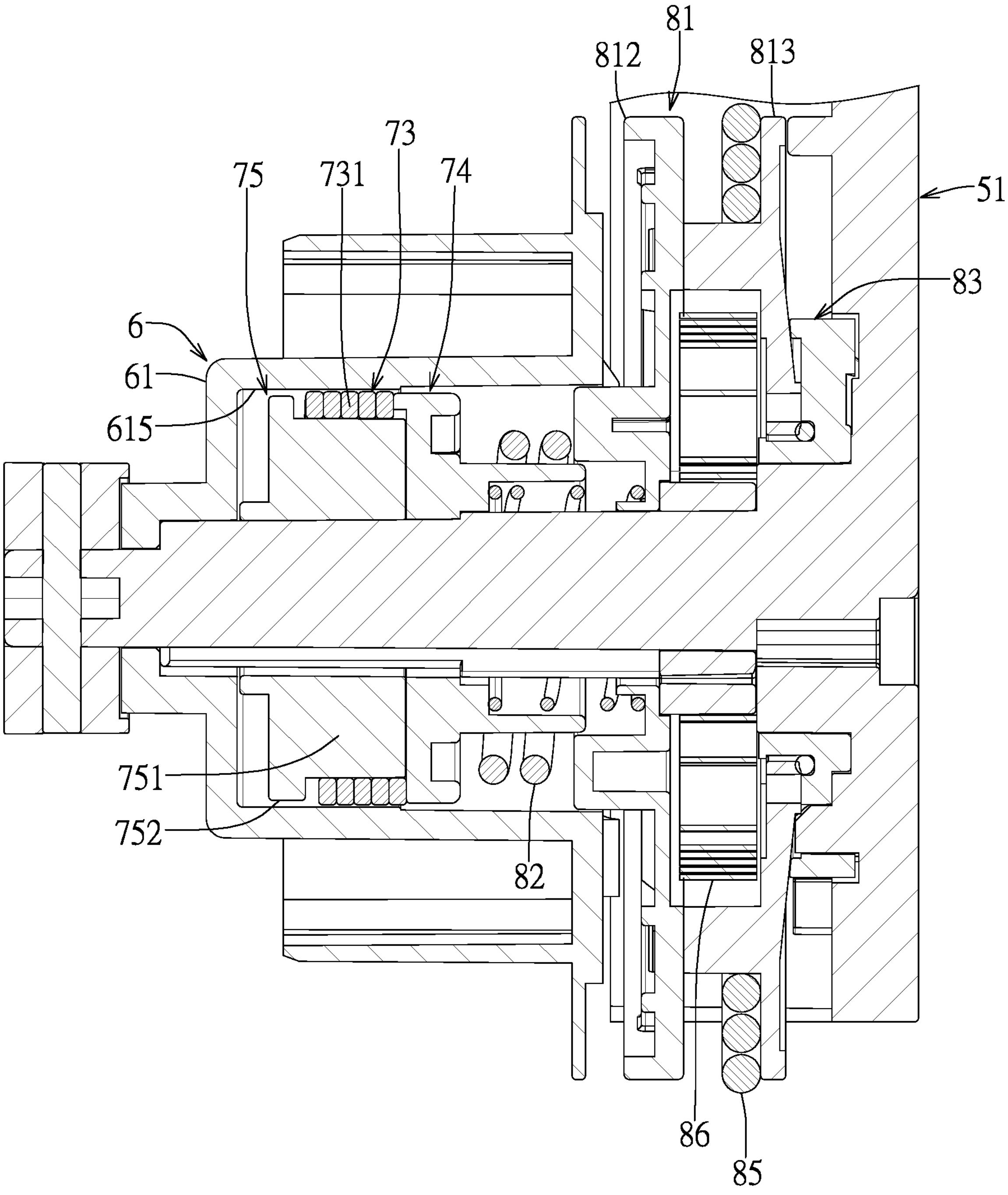
FIG. 14 is a sectional view similar to FIG. 8, illustrating when the torsion spring is in a released state.
Figure 15:
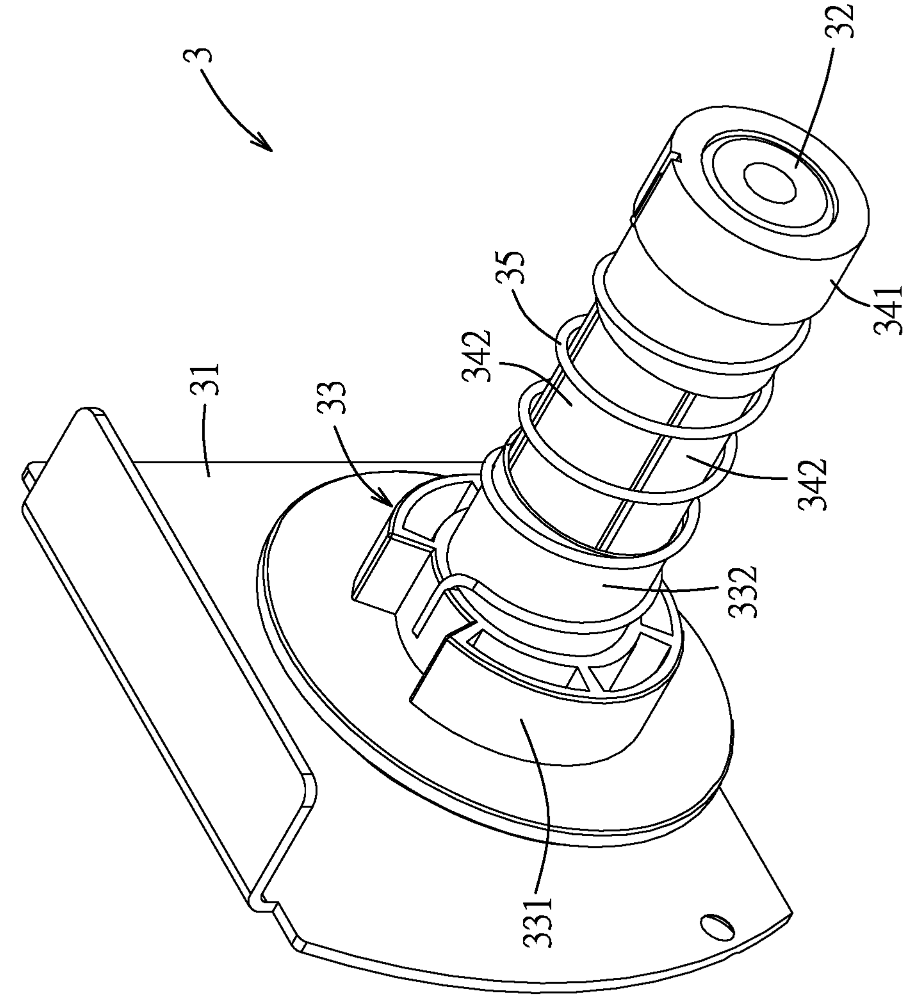
FIG. 15 is a perspective view of a rotating support module of the embodiment.
Figure 16:
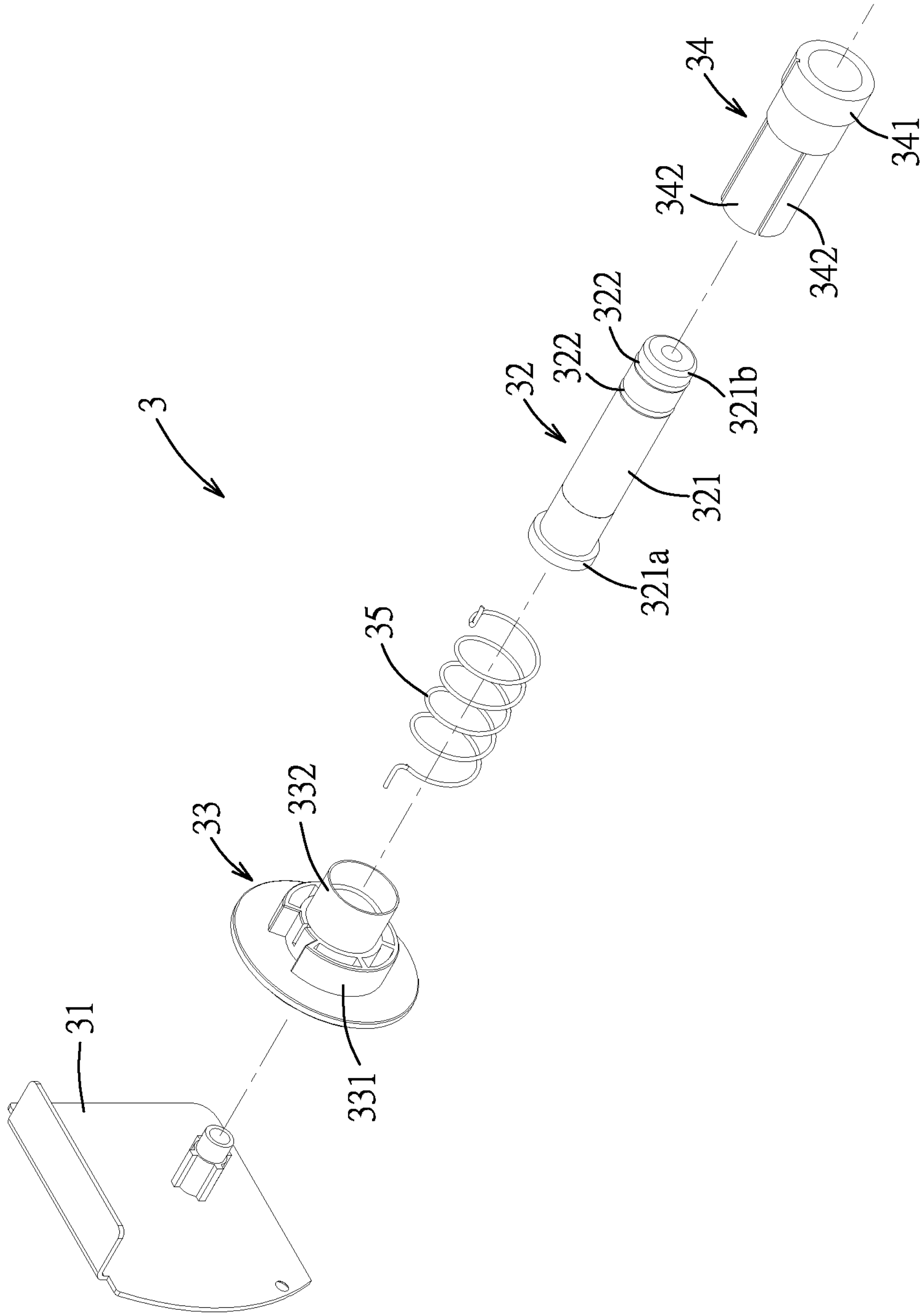
FIG. 16 is an exploded perspective view of the rotating support module.
Figure 17:
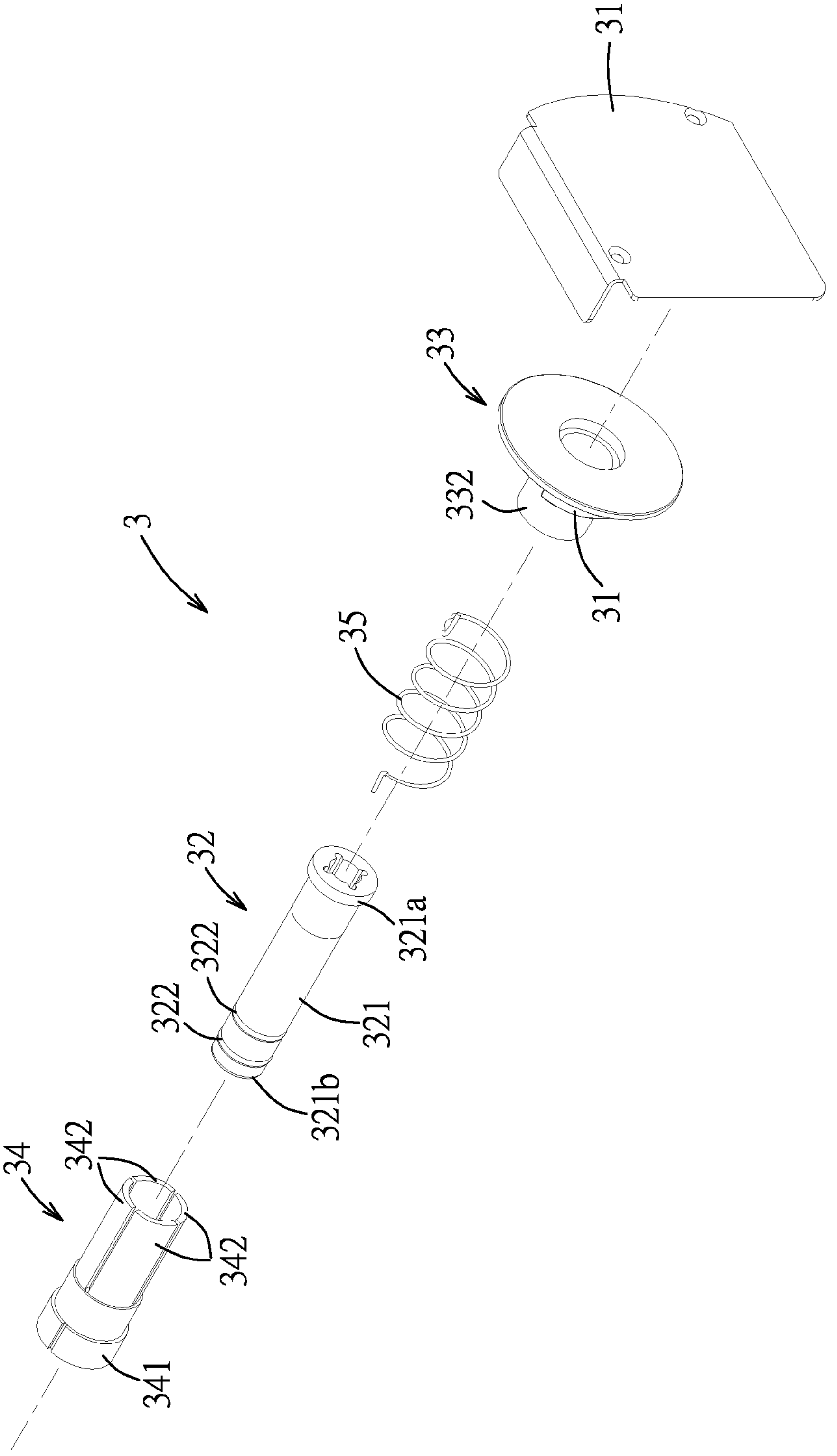
FIG. 17 is an exploded perspective view similar to FIG. 16, but taken from another angle.

With reference to FIG. 14, when the pulling force is applied to the pull cord 85 to the end, the release reel 74 brings the torsion spring 73 to the released state where the coil section 731 is disengaged from the inner peripheral wall 615. At this stage, the transmitting wheel 6 is rotatable freely such that the blind 9 (see FIG. 1) on the horizontal axle 4 is lowered by virtue of its weight. With the speed reducing means of the rotating support module 3 to reduce the rotational speed of the horizontal axle 4, the blind 9 is lowered slowly. With the sleeve portion 751 of the retaining sleeve 75 abutting against the coil section 731 to limit the amount of reduction of the coil section 731 during pulling, the outer diameter of the torsion spring 73 is reduced stably when the torsion spring 73 is shifted to the released state.

With reference to FIG. 8, when the pulling force is released from the pull cord 85, the driving reel 81 is rotated in an opposite rotational direction by means of the reel biasing member 86 to reel the pull cord 85 and the transmitting member 82 is released. The compression spring 89 provides the driving reel 81 with a returning force to bias the driving reel 81 back to the normal position. At this stage, the torsion spring 73 is returned by its restored biasing force to the tightened state where the coil section 731 is in frictional and pressed engagement with the inner peripheral wall 615. With the flange portion 752 of the retaining sleeve 75 abutting against the coil section 731 to position the coil section 731 after the returning of the torsion spring 73, the coil section 731 can be in tightly frictional engagement with the inner peripheral wall 615. Meanwhile, the torsion spring 73 brings the release reel 74 to rotate and return. Thus, by means of the coil section 731 in tightly engagement with the inner peripheral wall 615, the transmitting wheel 6 is stopped rotation and the blind 9 is positioned at a desired height position.

With reference to FIGS. 5, 6, 7 and 9, the operator applies an uprightly downward pulling force to the pull cord 85 to lift the blind 9, the hindering member 84 is turned to the keeping-off position where the hindering portion 842 is remote from the engaging notch (837*a*). The driving reel 81 is rotated by the pull cord 85 to rotate the thrust member 83. During the rotation of the thrust member 83, the tab 839 is disengaged from the cavity (520*a*), and the sliding protrusions 838 slide along the annular grooves 515 such that the thrust member 83 is moved spirally away from the mounting plate 511 to the thrusting position so as to move the driving reel 81 to the driving position. With the meshing engagement of the reel ratchet portion 817 and the wheel ratchet portion 622 of the transmitting wheel 6, the driving reel 81 in the driving position drives rotation of the transmitting wheel 6 and the horizontal axle 4 in the clockwise rotational direction so as to reel and lift the blind 9.

When the pull cord 85 is released, the driving reel 81 is returned to the normal position by means of the compression spring 89, the thrust member 83 is returned to the initial position, and the pull cord 85 is reeled on the driving reel 81. Similarly, the transmitting wheel 6 is interfered with the anti-backward wheel 71 and is not rotated backward by means of the horizontal axle 4 so as to keep the blind 9 at an appropriate height position. In case of a long blind 9, the operations of pulling downward and releasing of the pull cord 85 should be repeated so as to lift the blind 9 with a relative long distance.

As mentioned above, the pull cord 85 is reeled on the driving reel 81 in the non-operated state, which can avoid entangling children and objects nearby. The operation of lifting the blind 9 is convenient to conduct.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A blind lifting control module connectable with an end of a horizontal axle for controlling rotation of the axle, comprising:

a supporting unit including a base seat and a mounting shaft which is securely connected with said base seat and which extends parallel to the horizontal axle from said base seat, said mounting shaft having a shaft portion;

a transmitting wheel rotatably sleeved on said mounting shaft, and including an axle connecting body which is securely connectable with the end of the horizontal axle, and a flange disc which is connected with a side of said axle connecting body proximate to said base seat and which extends radially and outwardly from said axle connecting body, said axle connecting body having a receiving groove which extends from said side for receiving said shaft portion, and an inner peripheral wall which surrounds said receiving groove, said flange disc having a wheel ratchet portion which is formed on a surface that faces said base seat and surrounds said receiving groove;

an anti-backward unit including a torsion spring which is received in said receiving groove and which surrounds said shaft portion, said torsion spring being operable and deformable relative to said inner peripheral wall between a tightened state, where said torsion spring is in tightly frictional engagement with said inner peripheral wall to permit a uni-directional rotation of said transmitting wheel, and a released state, where said torsion spring is disengaged from said inner peripheral wall, said torsion spring having an outer diameter in the released state which is smaller than that in the tightened state; and a driving unit including a driving reel which is rotatably sleeved on said shaft portion, a transmitting member which is connected between said driving reel and said anti-backward unit to transmit a rotation of said driving reel to shift said torsion spring from the tightened state to the released state, a thrust member which is movably disposed to said base seat, a hindering member which is pivotably disposed to said base seat, a pull cord which has an end secured to said driving reel and which winds on a periphery of said driving reel to have a free end for pulling operation, and a reel biasing member, said driving reel having a reel ratchet portion which faces said wheel ratchet portion and being movable relative to said shaft portion between a driving position, where said reel ratchet portion meshes with said wheel ratchet portion, and a normal position, where said reel ratchet portion is disengaged from said wheel ratchet portion, said thrust member being movable relative to said base seat between an initial position, where said thrust member is free from action with said driving reel, and a thrusting position, where said thrust member provides a thrust force to move said driving reel to the driving position, said hindering member being turnable relative to said base seat between a hindering position, where said hindering member is kept to position said thrust member in the initial position, and a keeping-off position, where said thrust member is allowed for movement to the thrusting position, said free end of said pull cord passing through said hindering member to receive a pulling force to turn said hindering member, said reel biasing member being disposed to bias said driving reel to rotate to reel said pull cord.

2. The blind lifting control module of claim 1, wherein said torsion spring is rectangular in cross-section to be in a surface frictional engagement with said inner peripheral wall of said transmitting wheel.

3. The blind lifting control module of claim 1, wherein said anti-backward unit further includes a release reel disposed in said receiving groove of said transmitting wheel and rotatably sleeved on said shaft portion, said release reel being connected between said torsion spring and said transmitting member, and being rotated through said transmitting member to rotate said torsion spring so as to shift said torsion spring from the tightened state to the released state.

4. The blind lifting control module of claim 3, wherein said transmitting member is in form of a string having two ends respectively secured to said release reel and said driving reel, said transmitting member surrounding said release reel such that said transmitting member is tensed by a pulling force applied to said pull cord through said driving reel to rotate said release reel so as to bring said torsion spring to rotate and reduce its outer diameter.

5. The blind lifting control module of claim 3, wherein said anti-backward unit further includes a retaining sleeve disposed in said receiving groove of said transmitting wheel and non-rotatably sleeved on said shaft portion, said torsion spring being sleeved around said retaining sleeve, and having two ends respectively and retainingly connected with said retaining sleeve and said release reel.

6. The blind lifting control module of claim 5, wherein said release reel is formed with an engaging slot, said retaining sleeve being formed with a spring engaging slot, said retaining sleeve having a sleeve portion which is disposed adjacent to said release reel, and a flange portion which extends radially from an end of said sleeve portion, said torsion spring having a coil section, a connecting spring end and a pulled spring end at two opposite ends of said coil section, said connecting spring end and said pulled spring end being retained in said spring engaging slot and said engaging slot.

7. The blind lifting control module of claim 5, wherein said shaft portion has a shoulder for abutment of said release reel thereagainst to prevent axial movement of said release reel along said shaft portion, and a non-circular portion for said retaining sleeve to be securely sleeved thereon, said retaining sleeve being formed with a non-circular axial hole engaged with said non-circular portion to prevent rotation and axial movement of said release sleeve relative to said shaft portion.

8. The blind lifting control module of claim 3, wherein said driving unit further includes a compression spring, said compression spring having two ends which respectively abut against said release reel and said driving reel so as to bias said driving reel toward the normal position.

9. The blind lifting control module of claim 1, wherein said thrust member is pivotably disposed to said shaft portion, and has a forced portion through which said pull cord passes to be turned by a pulling action of said pull cord, and a thrust portion which is disposed at an opposite side of said driving reel relative to said reel ratchet portion to thrust said driving reel such that said thrust member is activated by the pulling action of said pull cord to turn from the initial position to the thrusting position.

10. The blind lifting control module of claim 9, wherein said hindering member has a fulcrum portion that is pivotably connected to said base seat, a hindering portion that is disposed upwardly of said fulcrum portion to engage with said thrust member for hindering turning of said thrust member, and a pull portion that is disposed downwardly of said fulcrum portion, said pull cord passing through said pull portion.

11. The blind lifting control module of claim 10, wherein said thrust portion has an engaging notch to be engaged with said hindering portion when said hindering member is turned to the hindering position.

12. The blind lifting control module of claim 10, wherein said hindering member further has a returning post deformably abutting against said base seat, said returning post being elastically bent when said hindering member is turned from the hindering position to the keeping-off position, and being returned back its posture to keep said hindering member in the hindering position.

13. The blind lifting control module of claim 9, wherein said base seat has a mounting plate which extends in the upright direction transverse to said shaft portion of said mounting shaft, said mounting plate having a plurality of annular grooves which surround said shaft portion and are angularly spaced from each other, said thrust portion of said thrust member having an annular portion which is rotatable about and sleeved on said shaft portion, and a plurality of sliding protrusions which project from said annular portion and which are respectively and slidably engaged in said annular grooves so as to move said annular portion away from said mounting plate with rotation of said annular portion relative to said shaft portion to thrust said driving reel.

14. The blind lifting control module of claim 13, wherein said forced portion of said thrust member is in form of a tube which extends axially from an inner periphery of said annular portion and which is inserted into said driving reel, said driving unit further including a transmitting ring which is sleeved on said forced portion and frictionally interposed between said forced portion and said driving reel so as to transmit rotation of said driving reel to rotate said forced portion.

15. The blind lifting control module of claim 14, wherein said driving reel has an axial through hole, a plurality of arcuate holes surrounding said axial through hole, and a plurality of flexible holding arms interposed between said axial through hole and said arcuate holes and respectively aligned with said arcuate holes, said forced portion being in form of a tubular wall which is disposed in said axial through hole and which is held by said flexible holding arms.

16. The blind lifting control module of claim 14, wherein said annular portion has at least one elongated groove extending along said inner periphery, said base seat further having at least one stud which is disposed on said mounting plate and movably engaged in said elongated groove so as to limit the rotation of said thrust member.

17. The blind lifting control module of claim 13, wherein said base seat further has a stop wall projecting from said mounting plate and having an upwardly opened cavity, said annular portion having an engaging notch such that said hindering portion is engaged and restricted in said engaging notch in the hindering position, said thrust member further having a tab projecting from an outer peripheral surface of said annular portion and formed diametrically opposite to said engaging notch, wherein said tab is engaged in said cavity and is stopped by said stop wall when said thrust member is in the initial position.

18. A blind lifting device comprising:

a rail extending in an axial horizontal direction and having first and second ends opposite to each other;

a blind lifting control module as claimed in claim 1, wherein said base seat of said supporting unit is connected with said first end of said rail to have said shaft portion extending toward said second end;

a rotating support module connected with said second end of said rail; and a horizontal axle for reeling a blind thereon, said horizontal axle having two ends which are respectively connected with said blind lifting control module and said rotating support module so as to be controlled for its rotation by said blind lifting control module to lift and lower the blind.

19. The blind lifting device of claim 18, wherein said horizontal axle is in form of a tubular shaft and has a blind engaging portion which is concaved from an outer surrounding wall and which is elongated horizontally to said two ends to define an elongated slot for securely engaging with the blind, said axle connecting body of said transmitting wheel of said blind lifting control module being inserted into one of said ends of said horizontal axle, and having a first retaining slot which is retainingly connected with said blind engaging portion, said rotating support module including a mounting wall which extends in an upright direction to be connected with said rail, a support axle which is secured to said mounting wall and which extends horizontally toward said blind lifting control module, and a rotary seat which is rotatably sleeved on said support axle, said rotary seat having an axle connecting portion which is inserted into the other one of said ends of said horizontal axle and which has a second retaining slot that is retainingly connected with said blind engaging portion.

20. The blind lifting device of claim 19, wherein said rotary seat of said rotating support module further has a tubular portion which extends horizontally from said axle connecting portion toward said blind lifting control module to spacedly surround said support axle and which has a diameter smaller than that of said axle connecting portion, said support axle having an axle body and at least one frictional ring, said axle body having a secured end portion which is secured to said mounting wall, and a free end portion which is opposite to said secured end portion and exposed from said rotary seat, said frictional ring surrounding said free end portion, said rotating support module further including a speed-reducing sleeve and a coil member, said speed-reducing sleeve having a sleeve body which is sleeved on said free end portion, and a plurality of elastic plates which are arranged around said axle body and which extend from said sleeve body toward said rotary seat and have terminate ends interposed between said tubular portion and said axle body, said coil member being sleeved around said speed-reducing sleeve and having two ends which are respectively secured to said rotary seat and said sleeve body such that, during rotation of said horizontal axle to lower the blind, said speed-reducing sleeve is in frictional contact with said frictional ring to have a rotational speed slower than that of said rotary seat, and to shrink said coil member to compress said elastic plates toward said axle body so as to reduce the rotational speed of said rotary seat.

* * * * *